United States Patent
Hong

(10) Patent No.: US 12,516,045 B2
(45) Date of Patent: Jan. 6, 2026

(54) PROCESS FOR SYNTHESIS OF A 2-THIOALKYL PYRIMIDINE

(71) Applicant: FMC Corporation, Philadelphia, PA (US)

(72) Inventor: Junbae Hong, Newark, DE (US)

(73) Assignee: FMC Corporation, Philadelphia, PA (US)

( * ) Notice: Subject to any disclaimer, the term of this patent is extended or adjusted under 35 U.S.C. 154(b) by 847 days.

(21) Appl. No.: 17/781,757

(22) PCT Filed: Dec. 2, 2020

(86) PCT No.: PCT/US2020/062779
§ 371 (c)(1),
(2) Date: Jun. 2, 2022

(87) PCT Pub. No.: WO2021/113282
PCT Pub. Date: Jun. 10, 2021

(65) Prior Publication Data
US 2023/0068064 A1    Mar. 2, 2023

Related U.S. Application Data

(60) Provisional application No. 62/942,490, filed on Dec. 2, 2019.

(51) Int. Cl.
*C07D 413/12*    (2006.01)

(52) U.S. Cl.
CPC .................... *C07D 413/12* (2013.01)

(58) Field of Classification Search
CPC ...................................................... C07D 413/12
See application file for complete search history.

(56) References Cited

FOREIGN PATENT DOCUMENTS

WO    2015/108779    7/2015

OTHER PUBLICATIONS

Davies et al., Preparation of 2-chloro-1,3 Bis(dimethylamino) Trimethinium Hexafluorophosphate [[Methanaminium, N-[2-chloro-3-(dimethylamino)-2-propenylidene]-N-methyl-, hexafluorophosphate(1-)]], Organic Syntheses, vol. 80, p. 200-206 (2003).
Maltsev et al., "Synthesis of Soai Type 2-Arylpyrimidine-5-carbaldehydes through Desulfurative Cross-Coupling with Arylboronic Acids", European Journal of Organic Chemistry, 2014, p. 7426-7432.
Palucki et al., "Profiling the Formation of 2-Chloro-N,N-dimetylamino Trimethinium Chloride Salt, a Key Intermediate in the Manufacturing Process of Etoricoxib", Organic Process Research & Development, vol. 9, No. 2, 2005, p. 141-148.
Yamanaka et al., "Preparation of Novel beta-Trifluoromethyl Vinamidinium Salt and its Synthetic Application to Trifluoromethylated Heterocycles", Tetrahedron Letters, vol. 37, No. 11, 1996, p. 1829-1832.
Von Angerer et al., "Product class 12: pyrimidines" Section 16.12, Science of Synthesis, 2004, Georg Thieme Verlag KG, p. 379-572.
Jin, et al., "Synthesis and antitumor activity of ureas containing pyrimidinyl group", European Journal of Medicinal Chemistry, vol. 46, No. 1, 2011, p. 429-432.
International Search Report of corresponding International Application No. PCT/US2020/062779.
Xie et al., "Green Synthesis of 4,6-Dimethyl-2-(methylsuflonyl)pyrimidine", Chemistry, vol. 73, No. 8, pp. 742-745, 2010.

*Primary Examiner* — Kamal A Saeed
(74) *Attorney, Agent, or Firm* — FMC Corporation

(57) ABSTRACT

A method for preparing a compound of Formula 1 and compounds therefrom, comprising treating a compound of Formula 2 with a compound of Formula 3 and reacting the resulting intermediate of Formula 4 with a compound of Formula 5 (or a salt thereof). The compound of Formula 1, prepared by the above method, can be used to prepare a compound of Formula 8 wherein $R^2$, $R^3$, $R^4$, m and r are as defined in the specification.

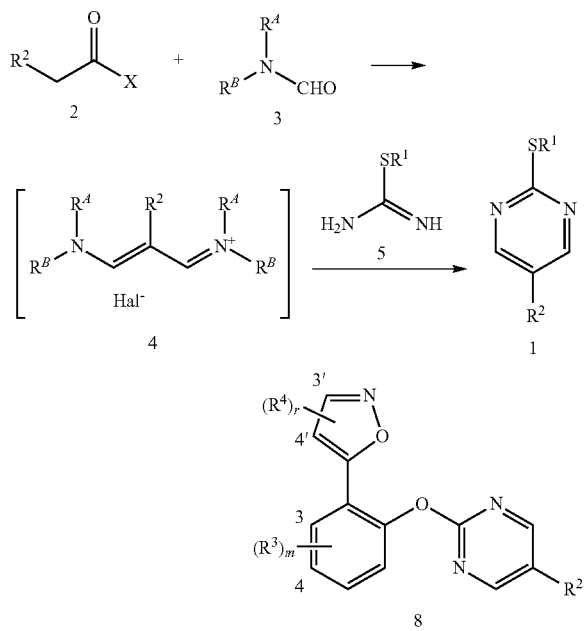

20 Claims, No Drawings

PROCESS FOR SYNTHESIS OF A 2-THIOALKYL PYRIMIDINE

FIELD OF THE INVENTION

This invention relates to a method for preparing thioalkyl pyrimidines and compounds therefrom.

BACKGROUND OF THE INVENTION

Methods of preparing certain pyrimidinyloxy benzene derivatives as herbicides are described in WO 2015/108779. Methods for preparing pyrimidine derivatives are disclosed in *Organic Synthesis* 2003, 80, 200-206; *Organic Process Research and Development* 2005, 9, 141-148 and *Eur. J. Org. Chem.* 2014, 7426-7432. While methods disclosed in the preceding references can provide the desired compounds, continuous improvement is sought, particularly in the development of methods to provide materials on a commercial scale. Therefore, the need continues for new methods that are less costly, more efficient, more flexible, or more convenient to operate.

SUMMARY OF THE INVENTION

This invention is directed to a method for preparing a compound of Formula 1

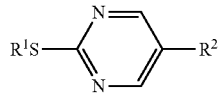

wherein
$R^1$ is $C_1$-$C_4$ alkyl; and
$R^2$ is halogen, $C_1$-$C_4$ alkyl or $C_1$-$C_4$ haloalkyl;
the method comprising treating a compound of Formula 2

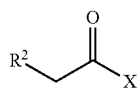

wherein
$R^2$ is halogen, $C_1$-$C_4$ alkyl or $C_1$-$C_4$ haloalkyl; and
X is Cl or OH
in the presence of a halogenating agent and a compound of Formula 3

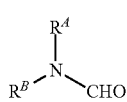

wherein
$R^A$ and $R^B$ are each independently $C_1$-$C_4$ alkyl; or
$R^A$ and $R^B$ are taken together to be —(CH$_2$)$_4$—, —(CH$_2$)$_5$— or —CH$_2$CH$_2$OCH$_2$CH$_2$— to provide an intermediate of Formula 4

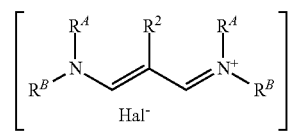

wherein
$R^2$ is halogen, $C_1$-$C_4$ alkyl or $C_1$-$C_4$ haloalkyl; and
$R^A$ and $R^B$ are each independently $C_1$-$C_4$ alkyl; or
$R^A$ and $R^B$ are taken together to be —(CH$_2$)$_4$—, —(CH$_2$)$_5$— or —CH$_2$CH$_2$OCH$_2$CH$_2$—; and
Hal$^-$ is chloride ion or bromide ion; and
treating the intermediate of Formula 4 in the presence of a base with an acid salt of a compound of Formula 5

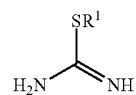

wherein $R^1$ is $C_1$-$C_4$ alkyl.

This invention also provides a method for preparing a compound of Formula 8

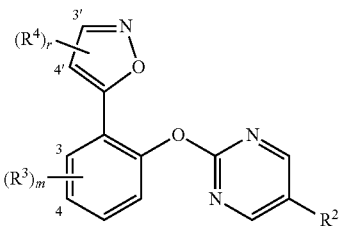

wherein
$R^2$ is halogen, $C_1$-$C_4$ alkyl or $C_1$-$C_4$ haloalkyl;
each $R^3$ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl;
each $R^4$ is independently halogen, cyano, $C_1$-$C_4$ alkyl, $C_1$-$C_4$ alkoxy, $C_1$-$C_4$ haloalkyl, $C_1$-$C_4$ haloalkoxy or SCF$_3$;
m is 0, 1, 2 or 3; and
r is 0, 1 or 2;
comprising treating a compound of Formula 2

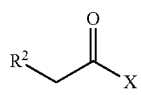

wherein
$R^2$ is halogen, $C_1$-$C_4$ alkyl or $C_1$-$C_4$ haloalkyl; and
X is Cl or OH in the presence of a halogenating agent and a compound of Formula 3

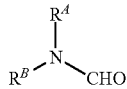
3 wherein
$R^A$ and $R^B$ are each independently $C_1$-$C_4$ alkyl; or
$R^A$ and $R^B$ are taken together to be —(CH$_2$)$_4$—, —(CH$_2$)$_5$— or —CH$_2$CH$_2$OCH$_2$CH$_2$—
to provide an intermediate of Formula 4

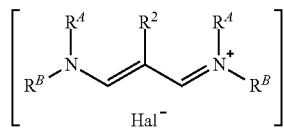
4 wherein
$R^2$ is halogen, $C_1$-$C_4$ alkyl or $C_1$-$C_4$ haloalkyl; and
$R^A$ and $R^B$ are each independently $C_1$-$C_4$ alkyl; or
$R^A$ and $R^B$ are taken together to be —(CH$_2$)$_4$—, —(CH$_2$)$_5$— or —CH$_2$CH$_2$OCH$_2$CH$_2$—; and
Hal$^-$ is chloride ion or bromide ion;
treating the intermediate of Formula 4 with an acid salt of a compound of Formula 5

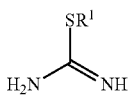
5 wherein $R^1$ is $C_1$-$C_4$ alkyl;
in the presence of a base to prepare a compound of Formula 1

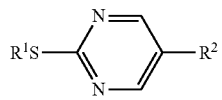
1 wherein
$R^1$ is $C_1$-$C_4$ alkyl;
$R^2$ is halogen, $C_1$-$C_4$ alkyl or $C_1$-$C_4$ haloalkyl;
treating the compound of Formula 1 with an oxidant to provide a compound of Formula 6

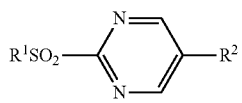
6 wherein
$R^1$ is $C_1$-$C_4$ alkyl; and
$R^2$ is halogen, $C_1$-$C_4$ alkyl or $C_1$-$C_4$ haloalkyl; and treating the compound of Formula 6 in the presence of a second base with a compound of Formula 7

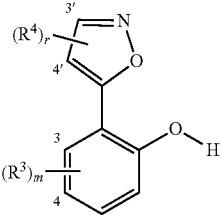
7 wherein
each $R^3$ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl;
each $R^4$ is independently halogen, cyano, $C_1$-$C_4$ alkyl, $C_1$-$C_4$ alkoxy, $C_1$-$C_4$ haloalkyl, $C_1$-$C_4$ haloalkoxy or SCF$_3$;
m is 0, 1, 2 or 3; and
r is 0, 1 or 2.

DETAILED DESCRIPTION OF THE INVENTION

As used herein, the terms "comprises," "comprising," "includes," "including," "has," "having," "contains", "containing," "characterized by" or any other variation thereof, are intended to cover a non-exclusive inclusion, subject to any limitation explicitly indicated.

For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition, process or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where applicants have defined an invention or a portion thereof with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "suitable" indicates that the entity so described is appropriate for use in the situation or circumstance indicated. As used herein, the terms "treatment", "treating" and the like denotes using a chemical, chemical process or process condition (e.g. heating) to alter the existing condition of other materials or compounds.

As used herein, the term "intermediate" refers to a compound or chemical entity in a chemical process that is prepared in a step after the starting material is provided and before the final product is prepared. In some instances, an intermediate is not isolated during the chemical process and is converted to a subsequent compound in situ. A set of brackets surrounding the chemical structure of an intermediate may be used herein to indicate that the intermediate is not isolated prior to its conversion to a subsequent compound; e.g. "[intermediate]".

As used herein, the term "telescopic" refers to a process in which at least one intermediate compound formed in the process is treated in a subsequent step of the process without its isolation. For example, a compound may be subjected to successive chemical reactions in just one reactor.

As used herein, "alkali metal" refers to elements of group 1 of the periodic table, including lithium, sodium, potassium and cesium, preferably sodium or potassium, or cations thereof, such as when used in combination with an anionic counterion to define a chemical compound.

In the above recitations, the term "alkyl", used either alone or in compound words such as "alkylthio" or "haloalkyl" includes straight-chain or branched alkyl, such as methyl, ethyl, n-propyl, i-propyl, or the different butyl, pentyl or hexyl isomers. "Alkenyl" includes straight-chain or branched alkenes such as ethenyl, 1-propenyl, 2-propenyl, and the different butenyl, pentenyl and hexenyl isomers. "Alkenyl" also includes polyenes such as 1,2-propadienyl and 2,4-hexadienyl. "Alkynyl" includes straight-chain or branched alkynes such as ethynyl, 1-propynyl, 2-propynyl and the different butynyl, pentynyl and hexynyl isomers.

"Alkoxy" includes, for example, methoxy, ethoxy, n-propyloxy, isopropyloxy and the different butoxy, pentoxy and hexyloxy isomers. "Alkoxyalkyl" denotes alkoxy substitution on alkyl. Examples of "alkoxyalkyl" include $CH_3OCH_2$, $CH_3OCH_2CH_2$, $CH_3CH_2OCH_2$, $CH_3CH_2CH_2OCH_2$ and $CH_3CH_2OCH_2CH_2$. "Alkylthio" includes branched or straight-chain alkylthio moieties such as methylthio, ethylthio, and the different propylthio, butylthio, pentylthio and hexylthio isomers.

The term "halogen", either alone or in compound words such as "haloalkyl", or when used in descriptions such as "alkyl substituted with halogen" includes fluorine, chlorine, bromine or iodine. Further, when used in compound words such as "haloalkyl", or when used in descriptions such as "alkyl substituted with halogen" said alkyl may be partially or fully substituted with halogen atoms which may be the same or different. Examples of "haloalkyl" or "alkyl substituted with halogen" include $CHF_2$, $F_3C$, $ClCH_2$, $CF_3CH_2$ and $CF_3CCl_2$.

The terms "haloalkoxy", and the like, is defined analogously to the term "haloalkyl". Examples of "haloalkoxy" include $CF_3O$—, $CCl_3CH_2O$—, $HCF_2CH_2CH_2O$— and $CF_3CH_2O$—. "Alkylcarbonyl" denotes a straight-chain or branched alkyl moieties bonded to a C(=O) moiety. Examples of "alkylcarbonyl" include $CH_3C(=O)$—, $CH_3CH_2CH_2C(=O)$— and $(CH_3)_2CHC(=O)$—. Examples of "alkoxycarbonyl" include $CH_3OC(=O)$—, $CH_3CH_2OC(=O)$—, $CH_3CH_2CH_2OC(=O)$—, $(CH_3)_2CHOC(=O)$— and the different butoxy- or pentoxycarbonyl isomers. "Alkylcarbonyloxy" denotes a straight-chain or branched alkyl moieties bonded to a C(=O)O— moiety. Examples of "alkylcarbonyloxy" include $CH_3C(=O)O$—, $CH_3CH_2CH_2C(=O)O$— and $(CH_3)_2CHC(=O)O$—.

The total number of carbon atoms in a substituent group is indicated by the "$C_i$-$C_j$" prefix where, for example, i and j are numbers from 1 to 4. For example, $C_1$-$C_4$ alkylsulfonyl designates methylsulfonyl through butylsulfonyl; $C_2$ alkoxyalkyl designates $CH_3OCH_2$—; $C_3$ alkoxyalkyl designates, for example, $CH_3CH(OCH_3)$—, $CH_3OCH_2CH_2$— or $CH_3CH_2OCH_2$—; and $C_4$ alkoxyalkyl designates the various isomers of an alkyl group substituted with an alkoxy group containing a total of four carbon atoms, examples including $CH_3CH_2CH_2OCH_2$— and $CH_3CH_2OCH_2CH_2$—.

When a compound is substituted with a substituent bearing a subscript that indicates the number of said substituents can exceed 1, said substituents (when they exceed 1) are independently selected from the group of defined substituents, (e.g., $(R^3)_m$, m is 0, 1, 2 or 3). When a group contains a substituent that can be hydrogen, for example (when m=0), then when this substituent is taken as hydrogen, it is recognized that this is equivalent to said group being unsubstituted. When a variable group is shown to be optionally attached to a position, (for example $(R^3)_m$ wherein m may be 0, then hydrogen may be at the position even if not recited in the variable group definition. When one or more positions on a group are said to be "not substituted" or "unsubstituted", then hydrogen atoms are attached to take up any free valency.

The term "optionally" when used herein means that the optional condition may or may not be present. For example, when a reaction is conducted optionally in the presence of a solvent, the solvent may or may not be present.

The term "optionally substituted" refers to groups which are unsubstituted or have at least one non-hydrogen substituent that does not extinguish the chemical or biological activity possessed by the unsubstituted analog. As used herein, the following definitions shall apply unless otherwise indicated. The term "optionally substituted with" is used interchangeably with the phrase "unsubstituted or substituted with" or with the term "(un)substituted with." Unless otherwise indicated, an optionally substituted group may have a substituent at each substitutable position of the group, and each substitution is independent of the other.

Embodiments of the invention include the following.

Embodiment A1. The method for preparing a compound of Formula 1 as described in the Summary of the Invention.

Embodiment A2. The method of Embodiment A1 wherein $R^1$ is $C_1$-$C_2$ alkyl.

Embodiment A3. The method of Embodiment A2 wherein $R^1$ is methyl.

Embodiment A4. The method of any of Embodiments A1 through A3 wherein the acid salt is the hemisulfate salt.

Embodiment A5. The method of any of Embodiments A1 through A4 wherein $R^2$ is halogen.

Embodiment A6. The method of Embodiment A5 wherein $R^2$ is chlorine.

Embodiment A7. The method of any of Embodiments A1 through A6 wherein X is Cl.

Embodiment A8. The method of any of Embodiments A1 through A6 wherein X is OH.

Embodiment A9. The method of any of Embodiments A1 through A8 wherein the halogenating agent is $POCl_3$.

Embodiment A9a. The method of any of Embodiments A1 through A8 wherein the halogenating agent is the Vilsmeier-Haack reagent.

Embodiment A10. The method of any of Embodiments A1 through A9 wherein $R^A$ and $R^B$ are each independently $C_1$-$C_4$ alkyl.

Embodiment A11. The method of Embodiment A10 wherein $R^A$ and $R^B$ are each independently $C_1$-$C_2$ alkyl.

Embodiment A12. The method of Embodiment A11 wherein $R^A$ and $R^B$ are each methyl.

Embodiment A13. The method of any of Embodiments A1 through A12 wherein the base is selected from alkali metal alkoxides, alkali metal acetates, alkali metal hydroxides and tertiary amines.

Embodiment A14. The method of any one of Embodiments A1 through A13 wherein the treating is performed in a suitable solvent.

Embodiment B1. The method of any of Embodiments A1 through A14 further comprising preparing a compound of Formula 6

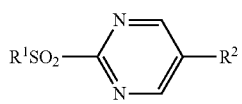
6 wherein
$R^1$ is $C_1$-$C_4$ alkyl; and
$R^2$ is halogen, $C_1$-$C_4$ alkyl or $C_1$-$C_4$ haloalkyl by treating a compound of Formula 1 with an oxidant.

Embodiment B2. The method of Embodiment B1 wherein $R^1$ is $C_1$-$C_2$ alkyl.

Embodiment B3. The method of Embodiment B2 wherein $R^1$ is methyl.

Embodiment B4. The method of any of Embodiments B1 through B3 wherein $R^2$ is halogen.

Embodiment B5. The method of Embodiment B4 wherein $R^2$ is chlorine.

Embodiment B6. The method of any of Embodiments B1 through B5 wherein the oxidant is selected from m-chloroperoxybenzoic acid, sodium periodate, potassium permanganate, potassium peroxymonosulfate and hydrogen peroxide.

Embodiment B7. The method of Embodiment B6 wherein the oxidant is selected from m-chloroperoxybenzoic acid, potassium peroxymonosulfate and hydrogen peroxide.

Embodiment B8. The method of Embodiment B7 wherein the oxidant is m-chloroperoxybenzoic acid.

Embodiment C1. The method of any of Embodiments A1 through A14 and B1 through B8 further comprising preparing a compound of Formula 8

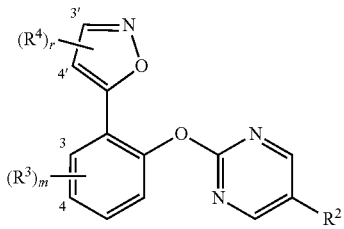
8 wherein
$R^2$ is halogen, $C_1$-$C_4$ alkyl or $C_1$-$C_4$ haloalkyl;
each $R^3$ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl;
each $R^4$ is independently halogen, cyano, $C_1$-$C_4$ alkyl, $C_1$-$C_4$ alkoxy, $C_1$-$C_4$ haloalkyl, $C_1$-$C_4$ haloalkoxy or $SCF_3$;
m is 0, 1, 2 or 3; and
r is 0, 1 or 2;
by treating the compound of Formula 6

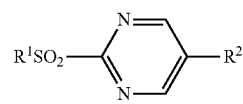
6 wherein
$R^1$ is $C_1$-$C_4$ alkyl; and
$R^2$ is halogen, $C_1$-$C_4$ alkyl or $C_1$-$C_4$ haloalkyl
in the presence of a second base with a compound of Formula 7

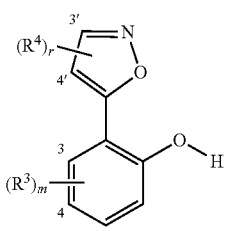
7 wherein
each $R^3$ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl;
each $R^4$ is independently halogen, cyano, $C_1$-$C_4$ alkyl, $C_1$-$C_4$ alkoxy, $C_1$-$C_4$ haloalkyl, $C_1$-$C_4$ haloalkoxy or $SCF_3$;
m is 0, 1, 2 or 3; and
r is 0, 1 or 2.

Embodiment C2. The method of Embodiment C1 wherein $R^2$ is halogen.

Embodiment C3. The method of Embodiment C2 wherein $R^2$ is chlorine.

Embodiment C4. The method of any of Embodiments C1 through C3 wherein m is 0.

Embodiment C5. The method of any of Embodiments C1 through C3 wherein each $R^3$ is independently halogen, cyano, $C_1$-$C_4$ alkyl or $C_1$-$C_4$ haloalkyl.

Embodiment C6. The method of Embodiment C5 wherein each $R^3$ is independently halogen or cyano.

Embodiment C7. The method of Embodiment C6 wherein each $R^3$ is independently cyano.

Embodiment C8. The method of Embodiment C6 wherein each $R^3$ is independently chlorine.

Embodiment C9. The method of Embodiment C6 wherein each $R^3$ is independently bromine.

Embodiment C10. The method of any of Embodiments C1 through C3 and C5 through C9 wherein m is 1 or 2 and $R^3$ is attached to the remainder of Formula 7 or Formula 8 at the 3- or 4-position or both the 3- and 4-positions.

Embodiment C11. The method of Embodiment C10 wherein m is 1.

Embodiment C12. The method of Embodiment C11 wherein $R^3$ is attached to the remainder of Formula 7 or Formula 8 at the 3-position.

Embodiment C13. The method of Embodiment C11 wherein $R^3$ is attached to the remainder of Formula 7 or Formula 8 at the 4-position.

Embodiment C14. The method of any of Embodiments C1 through C13 wherein each $R^4$ is independently halogen, cyano, $C_1$-$C_4$ alkyl, $C_1$-$C_4$ haloalkyl or C1-C4 haloalkoxy.

Embodiment C15. The method of Embodiment C14 wherein each $R^4$ is halogen or $C_1$-$C_4$ haloalkyl.

Embodiment C16. The method of Embodiment C15 wherein each $R^4$ is $C_1$-$C_4$ haloalkyl.

Embodiment C17. The method of Embodiment C16 wherein each $R^4$ is $C_1$-$C_4$ fluoroalkyl.

Embodiment C18. The method of Embodiment C17 wherein each $R^4$ is $C_1$ fluoroalkyl.

Embodiment C19. The method of any of Embodiments C1 through C18 wherein r is 0 or 1.

Embodiment C20. The method of Embodiment C19 wherein r is 1.

Embodiment C21. The method of Embodiment C20 wherein $R^4$ is substituted at the 3-position.

Embodiment C22. The method of any of Embodiments C1 through C21 wherein $R^1$ is $C_1$-$C_2$ alkyl.

Embodiment C23. The method of Embodiment C22 wherein $R^1$ is methyl.

Embodiment C24. The method of any of Embodiments C1 through C23 wherein the second base is selected from alkali metal alkoxides, alkali metal acetates, alkali metal hydroxides and tertiary amines.

Embodiment C25. The method of Embodiment C24 wherein the second base is an alkali metal carbonate.

Embodiment C26. The method of Embodiment C25 wherein the second base is potassium carbonate.

Embodiment C27. The method of Embodiment C1 wherein the compound of Formula 8 is selected from the group consisting of
2-[2-(3-bromo-5-isoxazolyl)phenoxy]-5-chloropyrimidine,
5-chloro-2-[2-[3-(difluoromethyl)-5-isoxazolyl]phenoxy]pyrimidine,
5-chloro-2-[2-[3-(trifluoromethyl)-5-isoxazolyl]phenoxy]pyrimidine,
5-chloro-2-[2-[3-(difluoromethyl)-5-isoxazolyl]-3-fluorophenoxy]pyrimidine,
5-bromo-2-[2-[3-(difluoromethyl)-5-isoxazolyl]-3-fluorophenoxy]pyrimidine,
5-chloro-2-[2-[3-(trifluoromethyl)-5-isoxazolyl]-3-chlorophenoxy]pyrimidine,
5-chloro-2-[2-[3-(trifluoromethyl)-5-isoxazolyl]-3-fluorophenoxy]pyrimidine,
5-chloro-2-[2-[3-(difluoromethyl)-5-isoxazolyl]-3-chlorophenoxy]pyrimidine,
5-bromo-2-[2-[3-(difluoromethyl)-5-isoxazolyl]-3-chlorophenoxy]pyrimidine,
5-bromo-2-[2-[3-(trifluoromethyl)-5-isoxazolyl]-3-chlorophenoxy]pyrimidine and
5-chloro-2-[2-[3-(difluoromethyl)-5-isoxazolyl]-3-bromophenoxy]pyrimidine.

Embodiment C28. The method of Embodiment C27 wherein the compound of Formula 8 is the compound of Formula 8A

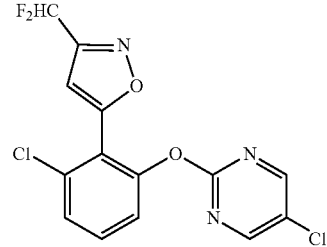

8A i.e. 5-chloro-2-[2-[3-(difluoromethyl)-5-isoxazolyl]-3-chlorophenoxy]pyrimidine (alternatively named 5-chloro-2-[3-chloro-2-[3-(difluoromethyl)-5-isoxazolyl]-phenoxy]-pyrimidine; CAS Number 1801862-02-1).

Embodiment C29. The method of any of Embodiments C1 through C28 wherein the compound of Formula 8 is prepared using the compound of Formula 6, prepared by the method described in any of Embodiments B1 through B8, and the compound of Formula 1 is prepared as described in any of Embodiments A1 through A14.

Embodiment D1. The method for preparing a compound of Formula 8 of the Summary of the Invention via an acid salt of a compound of Formula 5A

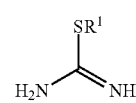

5 wherein $R^1$ is $C_1$-$C_4$ alkyl.

Embodiment D2. The method of Embodiment D1 wherein $R^1$ is $C_1$-$C_2$ alkyl.

Embodiment D3. The method of Embodiment D2 wherein $R^1$ is methyl.

Embodiment D4. The method of any of Embodiments D1 through D3 wherein the acid salt is the hemisulfate salt.

Embodiment D5. The method of any of Embodiments D1 through D4 wherein $R^2$ is halogen.

Embodiment D6. The method of Embodiment D6 wherein $R^2$ is chlorine.

Embodiment D7. The method of any of Embodiments D1 through D6 wherein X is Cl.

Embodiment D8. The method of any of Embodiments D1 through D6 wherein X is OH.

Embodiment D9. The method of any of Embodiments D1 through D8 wherein the halogenating agent is $POCl_3$.

Embodiment A9a. The method of any of Embodiments A1 through A8 wherein the halogenating agent is the Vilsmeier-Haack reagent.

Embodiment D10. The method of any of Embodiments D1 through D9 wherein $R^A$ and $R^B$ are each independently $C_1$-$C_4$ alkyl.

Embodiment D11. The method of Embodiment D10 wherein $R^A$ and $R^B$ are each independently $C_1$-$C_2$ alkyl.

Embodiment D12. The method of Embodiment D11 wherein $R^A$ and $R^B$ are each methyl.

Embodiment D13. The method of any of Embodiments D1 through D12 wherein the base is selected from alkali metal alkoxides, alkali metal acetates, alkali metal hydroxides and tertiary amines.

Embodiment D14. The method of any one of Embodiments D1 through D13 wherein the treating is performed in a suitable solvent.

Embodiment D15. The method of any of Embodiments D1 through D14 wherein the oxidant is selected from m-chloroperoxybenzoic acid, sodium periodate, potassium permanganate, potassium peroxymonosulfate and hydrogen peroxide.

Embodiment D16. The method of Embodiment D15 wherein the oxidant is selected from m-chloroperoxybenzoic acid, potassium peroxymonosulfate and hydrogen peroxide.

Embodiment D17. The method of Embodiment D16 wherein the oxidant is m-chloroperoxybenzoic acid.

Embodiment D18. The method of any of Embodiments D1 through D17 wherein m is 0.

Embodiment D19. The method of any of Embodiments D1 through D17 wherein each $R^3$ is independently halogen, cyano, $C_1$-$C_4$ alkyl or $C_1$-$C_4$ haloalkyl.

Embodiment D20. The method of Embodiment D19 wherein each $R^3$ is independently halogen or cyano.

Embodiment D21. The method of Embodiment D20 wherein each $R^3$ is independently cyano.

Embodiment D22. The method of Embodiment D20 wherein each $R^3$ is independently chlorine.

Embodiment D23. The method of Embodiment D20 wherein each $R^3$ is independently bromine.

Embodiment D24. The method of any of Embodiments D1 through D17 and D19 through D23 wherein m is 1 or 2 and $R^3$ is attached to the remainder of Formula 7 or Formula 8 at the 3- or 4-position or both the 3- and 4-positions.

Embodiment D25. The method of Embodiment D24 wherein m is 1.

Embodiment D26. The method of Embodiment D25 wherein $R^3$ is attached to the remainder of Formula 7 or Formula 8 at the 3-position.

Embodiment D27. The method of Embodiment D25 wherein $R^3$ is attached to the remainder of Formula 7 or Formula 8 at the 4-position.

Embodiment D28. The method of any of Embodiments D1 through D27 wherein each $R^4$ is independently halogen, cyano, $C_1$-$C_4$ alkyl, $C_1$-$C_4$ haloalkyl or C1-C4 haloalkoxy.

Embodiment D29. The method of Embodiment D28 wherein each $R^4$ is halogen or $C_1$-$C_4$ haloalkyl.

Embodiment D30. The method of Embodiment D29 wherein each $R^4$ is $C_1$-$C_4$ haloalkyl.

Embodiment D31. The method of Embodiment D310 wherein each $R^4$ is $C_1$-$C_4$ fluoroalkyl.

Embodiment D32. The method of Embodiment D31 wherein each $R^4$ is $C_1$ fluoroalkyl.

Embodiment D33. The method of any of Embodiments D1 through D32 wherein r is 0 or 1.

Embodiment D34. The method of Embodiment D33 wherein r is 1.

Embodiment D35. The method of Embodiment D35 wherein $R^4$ is substituted at the 3-position.

Embodiment D36. The method of any of Embodiments D1 through D35 wherein the second base is selected from alkali metal alkoxides, alkali metal acetates, alkali metal hydroxides and tertiary amines.

Embodiment D37. The method of Embodiment D36 wherein the second base is an alkali metal carbonate.

Embodiment D38. The method of Embodiment D37 wherein the second base is potassium carbonate.

Embodiment D39. The method of Embodiment D1 wherein the compound of Formula 8 is selected from the group consisting of 2-[2-(3-bromo-5-isoxazolyl)phenoxy]-5-chloropyrimidine, 5-chloro-2-[2-[3-(difluoromethyl)-5-isoxazolyl]phenoxy]pyrimidine, 5-chloro-2-[2-[3-(trifluoromethyl)-5-isoxazolyl]phenoxy]pyrimidine, 5-chloro-2-[2-[3-(difluoromethyl)-5-isoxazolyl]-3-fluorophenoxy]pyrimidine, 5-bromo-2-[2-[3-(difluoromethyl)-5-isoxazolyl]-3-fluorophenoxy]pyrimidine, 5-chloro-2-[2-[3-(trifluoromethyl)-5-isoxazolyl]-3-chlorophenoxy]pyrimidine, 5-chloro-2-[2-[3-(trifluoromethyl)-5-isoxazolyl]-3-fluorophenoxy]pyrimidine, 5-chloro-2-[2-[3-(difluoromethyl)-5-isoxazolyl]-3-chlorophenoxy]pyrimidine, 5-bromo-2-[2-[3-(difluoromethyl)-5-isoxazolyl]-3-chlorophenoxy]pyrimidine, 5-bromo-2-[2-[3-(trifluoromethyl)-5-isoxazolyl]-3-chlorophenoxy]pyrimidine and 5-chloro-2-[2-[3-(difluoromethyl)-5-isoxazolyl]-3-bromophenoxy]pyrimidine.

Embodiment D40. The method of Embodiment D39 wherein the compound of Formula 8 is the compound of Formula 8A

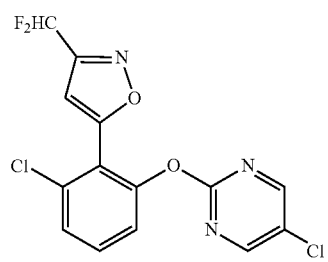

8A i.e. 5-chloro-2-[2-[3-(difluoromethyl)-5-isoxazolyl]-3-chlorophenoxy]pyrimidine (alternatively named 5-chloro-2-[3-chloro-2-[3-(difluoromethyl)-5-isoxazolyl]-phenoxy]-pyrimidine; CAS Number 1801862-02-1).

Embodiments of this invention, including Embodiments A1 through A14, B1 through B8, C1 through C29 and D1 through D40, above as well as any other embodiments described herein, can be combined in any manner, and the descriptions of variables in the embodiments pertain not only to the compounds of Formula 8 but also to the starting compounds and intermediate compounds of Formulae 1 through 7, useful for preparing the compounds of Formula 8.

Preferred Embodiments include:

Embodiment P1. The methods of the Summary of the Invention or any of Embodiments A1 through A14, B1 through B8, C1 through C29 and D1 through D40, wherein
$R^1$ is $C_1$-$C_2$ alkyl; and
each $R^A$ and $R^B$ is methyl.

Embodiment P2. The method of Embodiment P1 wherein $R^1$ is methyl and $R^2$ is halogen.

Embodiment P3. The method of Embodiment P2 wherein $R^2$ is chlorine.

Embodiment P4. The method of Embodiment P1 wherein X is Cl.

Embodiment P5. The method of any of Embodiments C1 through C29, Embodiments D1 through D49 or any of Embodiments P1 through P4 wherein
m is 0 or 1;
r is 0 or 1;
$R^2$ is halogen;
$R^3$ is halogen, cyano, $C_1$-$C_4$ alkyl or $C_1$-$C_4$ haloalkyl, wherein when m is 1, $R^3$ is attached to the remainder of Formula 7 and Formula 8 at the 3-position; and
$R^4$ is $C_1$-$C_4$ haloalkyl, wherein when r is 1, $R^4$ is substituted at the 3-position.

Embodiment P6. The method of Embodiment P5 wherein $R^2$ and $R^3$ are both chlorine.

Embodiment P7. The method of any of Embodiments P1 through P5 wherein $R^4$ is $C_1$ fluoroalkyl.

In the following Schemes the definitions of X, $R^A$, $R^B$, $R^1$, $R^2$, $R^3$, $R^4$, m and r in the compounds of Formulae 1 through 8 below are as defined above in the Summary of the Invention and description of embodiments unless otherwise indicated.

The methods described herein provide and efficient and robust synthesis of substituted pyrimidines of Formulae 1 and 6 useful in the preparation of herbicidal compounds of Formula 8.

As shown in Scheme 1, a compound of Formula 1 can be prepared in a telescopic manner, which comprises treating a compound of Formula 2 and a compound Formula 3 with a halogenating agent, optionally in a suitable solvent, to give an intermediate of Formula 4 and treating the intermediate of Formula 4 without its isolation with an acid salt of a compound of Formula 5 in the presence of base. Suitable halogenating agents include $POCl_3$, $POBr_3$, $SOCl_2$, $SOBr_2$, $(COCl)_2$ or $COCl_2$, preferably $POCl_3$, $SOCl_2$, $(COCl)_2$ or $COCl_2$. When a brominating agent is used, Hal⁻ in Formula 4 is a bromide ion and when a chlorinating agent is used, Hal⁻ in Formula 4 is a chloride ion. Phosphorus oxychloride, $POCl_3$, is a more preferred halogenating agent. Alternatively, the halogenating agent can be pre-prepared as the Vilsmeier-Haack reagent by the reaction of $COCl_2$ with N,N-dimethylformamide. Suitable solvents include N,N-dimethylformamide, dichloroethane, toluene, or acetonitrile. Suitable bases for this reaction include alkali metal alkoxides such as sodium methoxide and sodium isopropoxide; or alkali metal acetates such as sodium acetate and potassium acetate; alkali metal hydroxides such as sodium hydroxide; or tertiary amines such as triethylamine and diisopropylethylamine. N,N-dimethylformamide is a preferred compound of Formula 3. In some embodiments, notably when the compound of Formula 3 is N,N-dimethylformamide, an excess of the compound of Formula 3 can be used instead of an additional solvent. The compound of Formula 2 and the halogenating agent can be added to the compound of Formula 3 sequentially in any order, or simultaneously. A preferred acid salt is the hemisulfate of Formula 5A shown in Scheme 1.

Scheme 1

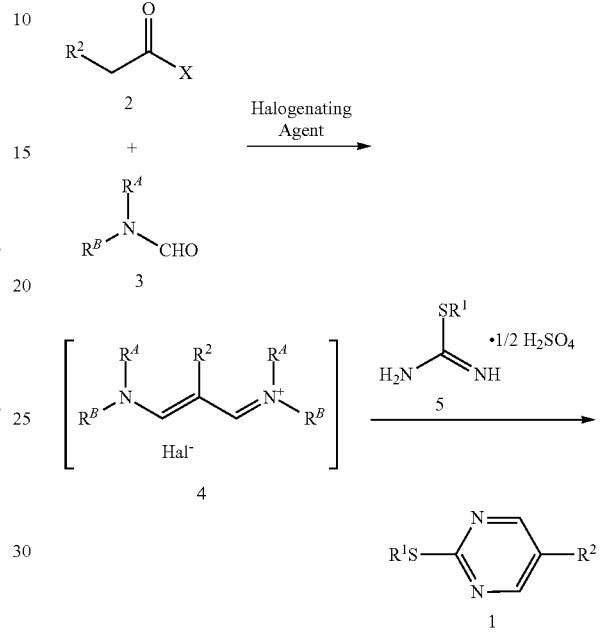

As shown in Scheme 2, an alkylsufonyl pyrimidine compound of Formula 6 can be prepared by oxidizing compounds of Formula 1 with an oxidant such as m-chloroperoxybenzoic acid, sodium periodate, potassium permanganate, potassium peroxymonosulfate (Oxone®) or hydrogen peroxide in a suitable solvent or a mixture of solvents such as water, dichloromethane, methanol, acetonitrile, acetic acid, or ethyl acetate.

Scheme 2

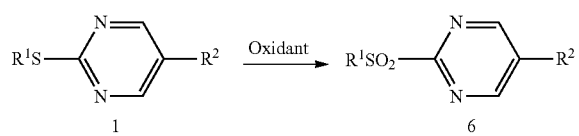

As shown in Scheme 3, this invention also relates to a method for preparing a compound of Formula 8 by coupling a pyrimidine of Formula 6, prepared as described above in Schemes 1 and 2, with a phenol of Formula 7, typically in the presence of a base and a solvent. Suitable solvents include acetonitrile, toluene, isopropyl alcohol, tetrahydrofuran, dimethyl sulfoxide or N,N-dimethylformamide. Suitable bases for the reaction include alkali metal hydrides such as sodium hydride; or alkali metal alkoxides such as sodium isopropoxide and potassium tert-butoxide; or alkali metal hydroxides such as potassium hydroxide and sodium hydroxide; or alkali metal carbonates such as potassium carbonate and cesium carbonate; or bases such as lithium bis(trimethylsilyl)amide, sodium bis(trimethylsilyl)amide and lithium diisopropylamide; or tertiary amines such as triethylamine and diisopropylethylamine. Preferably, a compound of Formula 8 can be prepared by nucleophilic substitution by heating a compound of Formula 6 with a compound of Formula 7 in a suitable solvent, such as acetonitrile or N,N-dimethylformamide in the presence of a base such as potassium or cesium carbonate, at temperatures ranging from 20 to 110° C., or from 50 to 110° C.

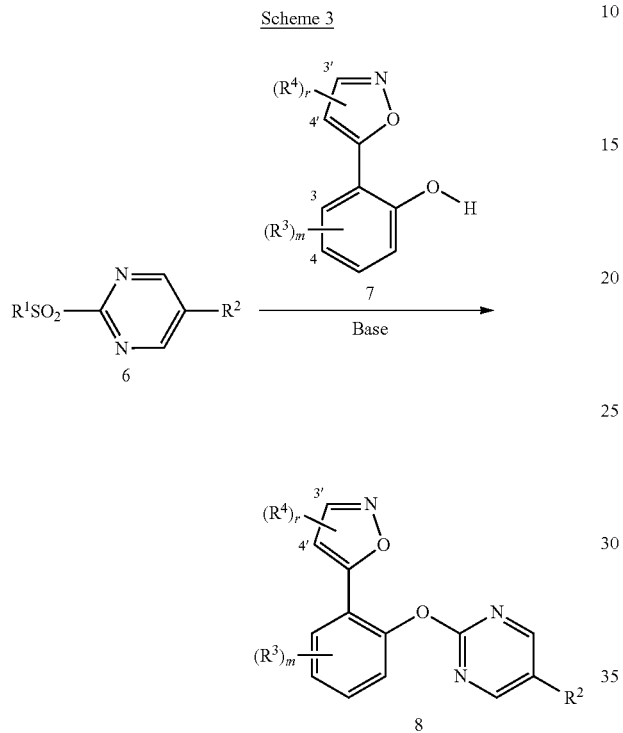

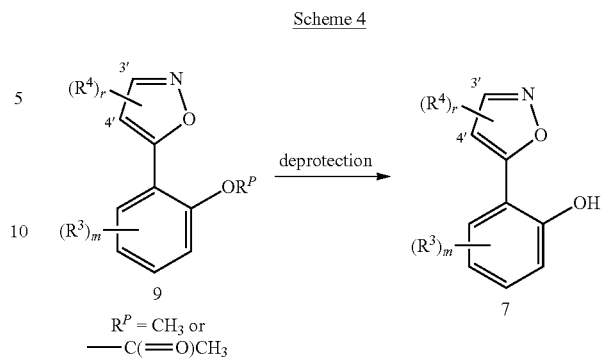

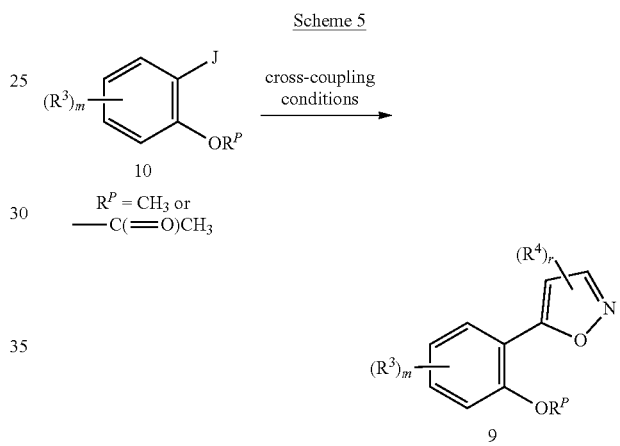

Compounds of Formula 7 can be prepared as described in WO2015/108779.

As shown in Scheme 4, a compound of Formula 7 can be prepared by deprotection of a compound of Formula 9 wherein $R^P$ is $CH_3$ or —C(=O)CH$_3$) with a suitable deprotecting agent. Suitable methoxy (i.e. when $R^P$ is $CH_3$) deprotecting reagents such as BBr$_3$, AlCl$_3$ and HBr in acetic acid can be used in the presence of a solvent such as toluene, dichloromethane and dichloroethane at a temperature of from −80 to 120° C. Suitable acetoxy (i.e. when $R^P$ is —C(=O)CH$_3$) deprotecting agents include potassium carbonate in methanol or ammonium acetate in aqueous methanol at room temperature can be used as discussed in Das, et al., *Tetrahedron* 2003, 59, 1049-1054 and methods cited. Alternatively, a compound of Formula 9 can be combined with a strongly acidic ion exchange resin such as Amberlyst® 15 (a microporous styrene divinylbenzene matrix functionalized with sulfonic acid moieties available from Dow Chemical, Midland Michigan) in methanol (as discussed in Das, et al. Tet. Lett. 2003, 44, 5465-5468) or combined with sodium acetate in ethanol (as discussed in Narender, T., et al. *Synthetic Communications* 2009, 39(11), 1949-1956) to obtain a compound of Formula 7. Other useful phenolic protecting groups suitable for use in preparing a compound of Formula 7 can be found in Greene, T. W.; Wuts, P. G. M. *Protective Groups in Organic Synthesis*, 4th ed.; Wiley: Hoboken, New Jersey, 1991.

An intermediate compound of Formula 9 can be prepared as shown generally in Scheme 5 from an intermediate compound of Formula 10 by a variety of methods known to one skilled in the art.

Compounds of Formula 9 can be accessed by coupling precursors of Formula 10 wherein J is Br, Cl, I or trifluoromethanesulfonate with boronate or trialkyltin group-containing isoxazole heterocycles using Suzuki conditions or Stille conditions. Suzuki couplings typically are conducted in the presence of Pd(0) or Pd(II) salts, a suitable ligand, and a base. Suitable bases for this transformation include potassium carbonate or cesium carbonate, while Pd(II) salts such as Pd(OAc)$_2$ or PdCl$_2$ can be used in conjunction with ligands such as triphenylphosphine or 1,1'-bis(diphenylphosphino)ferrocene (dppf). Conditions for Suzuki couplings are well documented in the literature (see for example *Angewandte Chemie International Edition* 2006, 45, 3484 and *Tetrahedron Letters* 2002, 58(14), 2885). Boron heterocyclic intermediates are commercially available or can be prepared from the corresponding halides or trifluoromethanesulfonates by methods known in the literature (see for example PCT Patent Publication WO 2007/043278, U.S. Pat. No. 8,080,566, *Organic Letters* 2011, 13(6), 1366 and *Organic Letters* 2012, 14(2), 600). Stille couplings typically can be conducted in the presence of Pd(0) or a Pd(II) salt, a ligand and a Cu(I) salt such as copper(I) iodide. The reaction can be run in a solvent such as dioxane, 1,2-dimethoxyethane or toluene at a temperature ranging from ambient to reflux temperature of the solvent. For conditions and reagents employed in Stille couplings see *Chemical Reviews* 2007, 107(1), 133-173.

Alternatively, compounds of Formula 10 wherein J is a boronate or trialkyltin group may be coupled with halogen-substituted isoxazolyl heterocycles (i.e. isoxazole-X) wherein X is a halogen using the Suzuki or Stille methods to afford compounds of Formula 9. The skilled chemist will realize that with the prudent choice of groups X and J in reactions involving compounds of Formula 10 and isoxazole-X one can synthesize the compound of Formula 7 utilizing various cross coupling procedures such as Kumada coupling, Hiyama coupling or Negishi coupling described in "Metal-Catalyzed Cross-Coupling Reactions", Eds. A. de Meijere and F. Diederich, Wiley-VCH, Weinheim, 2004, vols 1 and 2.

When J in Formula 10 is an alkene, alkyne, oxime, nitrile or ketone, various heterocycles can be prepared using methods described in Katritsky, *Advances in Heterocyclic Chemistry*, Vol. 1-104, Elsevier. In cases where regioisomeric mixtures are produced, the desired product can be isolated using routine separation techniques known in the art.

Notably, as shown in Scheme 6, a compound of Formula 7A can be prepared by treating a 2-hydroxyacetophenone of Formula 11 with an acylating agent LG(C=O)R$^4$ of Formula 12 wherein LG is chloro, alkoxy or —O(C=O)R$^4$, in the presence of a base to prepare a 4H-1-benzopyran-4-one of Formula 13
wherein
each R$^3$ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl; wherein each R$^3$ is attached to the remainder of the 4H-1-benzopyran-4-one of Formula 13 at the 5- or 6-position; and
R$^4$ is cyano, $C_1$-$C_4$ alkyl, or $C_1$-$C_4$ haloalkyl;
treating the 4H-1-benzopyran-4-one of Formula 13 with a hydroxylamine salt; and treating the resulting 1-(2-hydroxyphenyl)-butane-1,3-dione 3-oxime of Formula 14 with acid. In some instances, the compound of Formula 14 can be treated to provide cyclization of the isoxazole to form the compound of Formula 7A without isolation from the reaction mixture.

Scheme 6

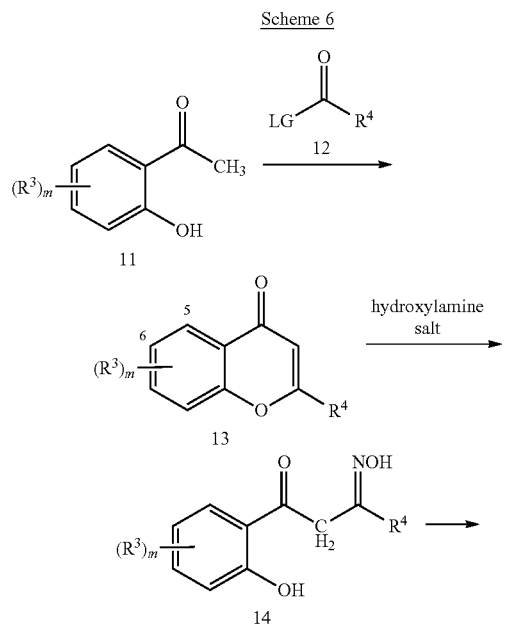

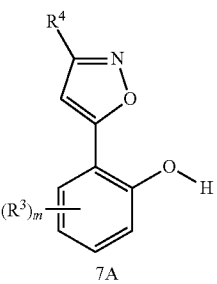

7A

Alternatively, a compound of Formula 13 may be prepared as shown in Scheme 7. Treatment of a nitrile of Formula 15 with methyl magnesium chloride followed by hydrolysis provides an ortho-halo acetophenone of Formula 16. Notably X$^1$ is chloro. In some instances, the compound of Formula 16 may be commercially available. Treatment of the compound of Formula 16 with an acylating agent LG(C=O)R$^4$ of Formula 12, wherein LG is chloro, alkoxy or —O(C=O)R$^4$, in the presence of a base provides a compound of Formula 17 that can be cyclized with displacement of the ortho-halogen to provide a compound of Formula 13. In some embodiments, the compound of Formula 17 cyclizes to the compound of Formula 13 under the conditions of the acylation of the compound of Formula 16, or by heating the compound of Formula 17, for example at temperatures of about 100 to 200° C., or about 120 to about 180° C., or about 140 to about 160° C. In any of such embodiments, the compound of Formula 17 does not need to be isolated.

Scheme 7

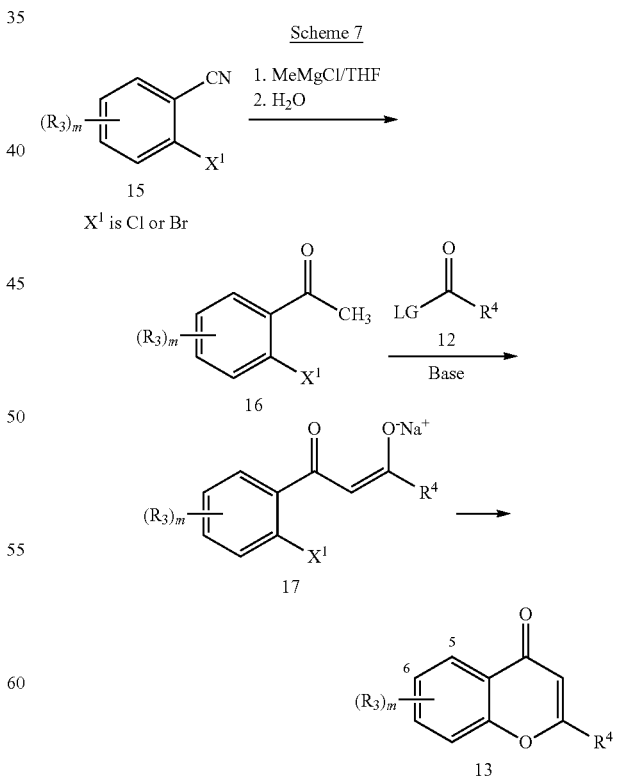

Similarly as shown in Scheme 8, a compound of Formula 7A can be prepared from a 2-methoxy acetophenone of Formula 18 by treatment with an acylating agent LG(C=O)R⁴ of Formula 12 wherein LG is alkoxy or —O(C=O)R⁴, in the presence of a base to prepare a di-keto compound of the Formula 19. The compound of Formula 19 can be treated with a hydroxylamine salt to provide a compound of Formula 21, which can be deprotected as described in relation to Scheme 4 to provide a compound of Formula 7A.

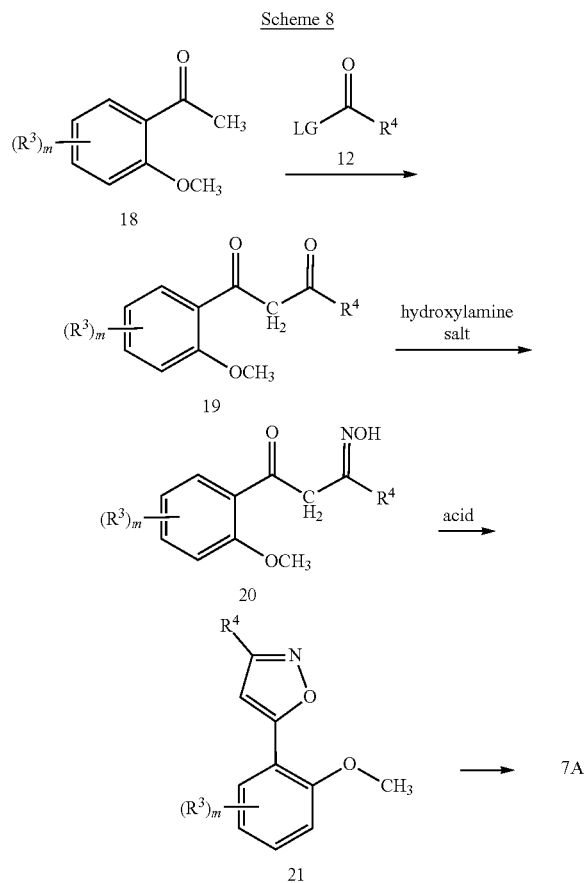

It is recognized that some reagents and reaction conditions described above for preparing compounds of Formulae 1-21 may not be compatible with certain functionalities present in the intermediates. In these instances, the incorporation of protection/deprotection sequences or functional group interconversions into the synthesis will aid in obtaining the desired products. The use and choice of the protecting groups will be apparent to one skilled in chemical synthesis (see, for example, Greene, T. W.; Wuts, P. G. M. *Protective Groups in Organic Synthesis*, 2nd ed.; Wiley: New York, 1991). One skilled in the art will recognize that, in some cases, after the introduction of a given reagent as it is depicted in any individual scheme, it may be necessary to perform additional routine synthetic steps not described in detail to complete the synthesis of compounds of Formulae 1-18. One skilled in the art will also recognize that it may be necessary to perform a combination of the steps illustrated in the above schemes in an order other than that implied by the particular sequence presented to prepare the compounds of Formulae 1-21. One skilled in the art will also recognize that compounds of Formulae 1-21 and the intermediates described herein can be subjected to various electrophilic, nucleophilic, radical, organometallic, oxidation, and reduction reactions to add substituents or modify existing substituents.

Without further elaboration, it is believed that one skilled in the art using the preceding description can utilize the present invention to its fullest extent. The following Examples are, therefore, to be construed as merely illustrative and not limiting of the disclosure in any way whatsoever. Steps in the following Examples illustrate a procedure for each step in an overall synthetic transformation, and the starting material for each step may not have necessarily been prepared by a particular preparative run whose procedure is described in other Examples or Steps. Percentages are by weight. The abbreviation "h" stands for "hour" or "hours"; "HPLC" means high performance liquid chromatography. ¹H NMR spectra are reported in ppm downfield from tetramethylsilane; s is singlet, d is doublet, dd is doublet of doublets, t is triplet and m is multiplet.

Synthesis Example 1

Preparation of 5-chloro-2-(methylthio)-pyrimidine (CAS Number 38275-42-2)

To a 100 mL jacketed reactor equipped with an overhead stirrer, a thermocouple, a recirculating heating and cooling bath, a nitrogen inlet, and a scrubber was added 41 mL of N,N-dimethylformamide, and the reactor was heated to 50° C. Chloroacetyl chloride (10 g, 88.5 mmol) was added dropwise, and the reaction mixture was kept at 50° C. for 1 h. The resulting mixture was then heated to 70° C. followed by the addition of phosphorus oxychloride (13.6 g, 88.5 mmol), dropwise to keep the temperature between 70 and 75° C. The reaction was kept at 70° C. for 4 h, and then cooled to 50° C. S-Methylisothiourea hemisulfate (12.3 g, 88.5 mmol), was added to the reaction mixture, followed by solid sodium methoxide (23.9 g, 443 mmol). The resulting mixture was heated to 60° C. for 2 h, and then cooled to 40° C. Water (60 mL) was added dropwise into the reactor, and the resulting slurry was cooled to 20° C. slowly and stirred for 2 h. The solid was then collected by filtration, washed with water, 20 mL, and dried at ambient temperature to afford the title compound, a compound of Formula 1, (8.5 g, 60% yield from chloroacetyl chloride). ¹H NMR (400 MHz, DMSO-d₆) δ 8.76 (s, 2H), 2.53 (s, 3H). M.P.=61.6° C.

Synthesis Example 2

Alternate Preparation of 5-chloro-2-(methylthio)-pyrimidine (CAS Number 38275-42-2)

To a 100 mL jacketed reactor equipped with an overhead stirrer, a thermocouple, a recirculating heating and cooling bath, a nitrogen inlet, and a scrubber was added 37 mL of N,N-dimethylformamide followed by the addition of phosphorus oxychloride (12.2 g, 79.7 mmol) dropwise while keeping the temperature below 30° C. After stirring the reaction mixture for 1 h, it was heated to 70° C. Chloroacetyl chloride (9 g, 79.7 mmol), was added dropwise, and the reaction mixture was kept at 70° C. for 4 h. S-Methylisothiourea hemisulfate (11.1 g, 79.7 mmol) was added to the reaction mixture, followed by solid sodium acetate (32.7 g, 398 mmol) after cooling to ambient temperature. The resulting mixture was heated to 60° C. for 2 h, and then cooled to 40° C. Water (54 mL) was added dropwise into the reactor, and the resulting slurry was cooled to 20° C. slowly and stirred for 2 h. The solid was then collected by filtration, washed with water, 20 mL, and dried at ambient temperature to afford 7.6 g of the title compound, a compound of Formula 1, (90.8 wt %, 55% yield from chloroacetyl chloride).

Synthesis Example 3

Alternate Preparation of 5-chloro-2-(methylthio)-pyrimidine (CAS Number 38275-42-2)

To a 100 mL jacketed reactor equipped with an overhead stirrer, a thermocouple, a recirculating heating and cooling bath, a nitrogen inlet, and a scrubber were added Vilsmeier-Haack reagent, 12.3 g (92.9 mmol) and 30 mL of N,N-dimethylformamide. The resulting slurry was then heated to 50° C. Chloroacetyl chloride, 10 g (88.5 mmol), was added dropwise to keep the reaction temperature between 50 and 52° C., and the reaction mixture was kept at 50° C. overnight. The resulting solution was cooled down to ambient temperature and transferred to an addition funnel. Triethylamine, 17.6 g (177 mmol) and 30 mL of N,N-dimethylformamide were added into the reactor, and the mixture was cooled down to 10° C. The solution in additional funnel was then added dropwise while keeping the temperature below 25° C., and S-methylisothiourea hemisulfate, 13.3 g (97.4 mmol) was added in one portion. The resulting reaction mixture was then heated to 70° C. for 4 h, and cooled down to 20° C. Water (100 mL) was added dropwise into the reactor, and the resulting slurry was stirred for 2 h. The solid was then collected by filtration, washed with water, 30 mL×2 times, and dried at room temperature to afford 10.1 g of the title product (99.3 wt %, 72% yield from chloroacetyl chloride). $^1$H NMR (400 MHz, DMSO-$d_6$) δ 8.76 (s, 2H), 2.52 (s, 3H). M.P.=61.6° C.

Synthesis Example 4

Preparation of 5-chloro-2-(methylsulfonyl)-pyrimidine (CAS Number 38275-47-7)

To a 100 mL jacketed reactor equipped with an overhead stirrer, a thermocouple, a recirculating heating and cooling bath, and a nitrogen inlet were added 5-chloro-2-(methylthio)-pyrimidine (i.e. the product of Synthesis Example 1, 2 or 3; 5 g, 31.1 mmol) and sodium tungstate dihydrate (0.52 g, 1.6 mmol) followed by water (15 mL) and ethyl acetate (15 mL) at ambient temperature. The resulting mixture was heated to 60° C., and then 50% aqueous hydrogen peroxide (5.3 g, 77.7 mmol), was added dropwise to maintain the reaction temperature between 60 and 65° C. After 2 h, the reaction was determined to be complete by HPLC. The reaction mixture was cooled to ambient temperature, and excess hydrogen peroxide in the reaction mixture was quenched with sodium bisulfite. The organic layer was then separated, and the aqueous layer was extracted with 15 mL of ethyl acetate. The combined organic layers were concentrated to give a crude product. Crystallization from toluene and heptane provided 5.6 g of the title compound, a compound of Formula 6, (93% yield from 5-chloro-2-(methylthio)-pyrimidine). $^1$H NMR (400 MHz, DMSO-$d_6$) δ 9.24 (s, 2H), 3.42 (s, 3H). M.P.=122° C.

Synthesis Example 5

Preparation of 5-chloro-2-[2-[3-(difluoromethyl)-5-isoxazolyl]-3-chlorophenoxy]pyrimidine (alternatively named 5-chloro-2-[3-chloro-2-[3-(difluoromethyl)-5-isoxazolyl]-phenoxy]-pyrimidine; CAS Number 1801862-02-1)

Step A: Preparation of 5-chloro-2-(difluoromethyl)-4H-1-benzopyran-4-one

To a 250-mL round-bottom flask equipped with overhead stirrer, distillation head, and nitrogen inlet were added sodium methoxide (10.8 g, 200 mmol) and N,N-dimethylacetamide (50 mL) at 25° C. A pre-mixed solution of 2,6-dichloroacetophenone (35 g, 181 mmol) and ethyl difluoroacetate (27 g, 218 mmol) in N,N-dimethylacetamide (20 mL) was added into the sodium methoxide slurry dropwise to keep the reaction temperature between 25 and 35° C. After 1 h at 35° C., methanol and ethanol, generated from the reaction, were removed by distillation under reduced pressure. To a separate 1-L round-bottom flask equipped with overhead stirrer, reflux condenser, and nitrogen inlet was added N,N-dimethylacetamide (80 mL), which was heated to 150° C. The reaction mixture was added into the hot N,N-dimethylacetamide over 2.5 h while keeping the temperature at 150° C. Upon completion as judged by HPLC analysis, the reaction mixture cooled to 50° C. Water (200 mL) was added slowly into the reactor, and the resulting slurry was cooled to 20° C. slowly and stirred for 1 h. The solid was then collected by filtration, washed with water (100 mL) and dried at ambient temperature to afford 38 g of the crude product. The crude product was treated with activated carbon to remove color impurities and recrystallized from toluene to give of the title compound (31.7 g) as a pale-yellow solid (76% yield from 2,6-dichloroacetophenone). $^1$H NMR S 7.79 (t, 1H), 7.70 (dd, 1H), 7.76 (dd, 1H), 7.15-6.89 (t, 1H), 6.68 (s, 1H). M.P.=113° C.

Step B: Preparation of 3-chloro-2-[3-(difluoromethyl)-5-isoxazolyl]-phenol

To a 500 mL jacketed reactor equipped with overhead stirrer and temperature probe were added 5-chloro-2-(difluoromethyl)-4H-1-benzopyran-4-one (i.e. the product of Step A, Synthesis Example 5; 50 g, 217 mmol), hydroxylamine hydrogen chloride salt (18.1 g, 260 mmol), and methanol (150 mL) at ambient temperature. Solid sodium acetate (21.3 g, 260 mmol) was added into the reaction mixture in one portion, and the resulting slurry was stirred overnight. Then, concentrated hydrogen chloride solution (34 g, 325 mmol) was added slowly, and the resulting slurry was stirred for 1 h. Upon completion as judged by HPLC, water (220 mL) was added into the reactor, and the slurry was stirred at ambient temperature for 2 h. The solid was then collected by filtration, washed with 10% methanol in water (150 mL) and dried at ambient temperature to afford 49.1 g of the title compound (93 wt %, 91% yield from 5-chloro-2-(difluoromethyl)-4H-1-benzopyran-4-one). $^1$H NMR δ 10.7 (s, 1H), 7.48-7.22 (t, 1H), 7.40 (t, 1H), 7.09 (d, 1H), 7.05 (s, 1H), 7.01 (d, 1H). M.P.=139.7° C.

Step C. Preparation of 5-chloro-2-[2-[3-(difluoromethyl)-5-isoxazolyl]-3-chlorophenoxy]-pyrimidine (alternatively named 5-chloro-2-[3-chloro-2-[3-(difluoromethyl)-5-isoxazolyl]-phenoxy]-pyrimidine; CAS Number 1801862-02-1)

To a 100 mL nitrogen-flushed glass jacketed reactor equipped with a heating/cooling recirculation bath, nitrogen inlet, temperature probe and overhead stirrer were added 3-chloro-2-[3-(difluoromethyl)-5-isoxazolyl]-phenol (i.e. the product of Step B, Synthesis Example 5; 4.02 g, 96.5 wt %, 15.8 mmol), 5-chloro-2-methylsulfonyl-pyrimidine (i.e. the product of Synthesis Example 4; 3.44 g, 97.0 wt %, 17.3 mmol) potassium carbonate (3.27 g, 23.7 mmol) and isopropyl alcohol (12.1 g). The resulting slurry was heated to 65° C. for 1 h and upon completion as judged by HPLC analysis, water (12.1 g) was added over 5 minutes. The reaction mixture was cooled to 54° C., the two liquid phases were allowed to separate, and the aqueous phase was removed. Upon cooling the organic solution to 0° C., a solid crystallized from the isopropyl alcohol. The solid was collected by filtration, washed with pre-cooled isopropyl alcohol/water mixture (4/1 v/v, 3.5 g), and dried under vacuum at 60° C. to afford of the title compound (4.62 g, 99.4 wt %, 81.2% yield), a compound of Formula 8. $^1$H NMR (400 MHz, CDCl$_3$) δ 8.44 (s, 2H), 7.47-7.55 (m, 2H), 7.22 (dd, 1H), 6.61-6.87 (t, 1H), 6.70 (s, 1H). M.P.=66.5° C.

By the procedures described herein together with methods known in the art, the following compounds can be prepared using the claimed methods. The following abbreviations are used in the Tables which follow: i means iso, Me means methyl (CH$_3$), Et means ethyl (CH$_2$CH$_3$), Pr means propyl, i-Pr means isopropyl, and Bu means butyl.

TABLE 1

1

| $R^1$ | $R^2$ | $R^1$ | $R^2$ | $R^1$ | $R^2$ | $R^1$ | $R^2$ | $R^1$ | $R^2$ |
|---|---|---|---|---|---|---|---|---|---|
| Me | F | Me | Cl | Me | CH$_3$ | Me | CHF$_2$ | Me | CH$_2$F |
| Et | F | Et | Cl | Et | CH$_3$ | Et | CHF$_2$ | Et | CH$_2$F |
| Pr | F | Pr | Cl | Pr | CH$_3$ | Pr | CHF$_2$ | Pr | CH$_2$F |
| i-Pr | F | i-Pr | Cl | i-Pr | CH$_3$ | i-Pr | CHF$_2$ | i-Pr | CH$_2$F |
| Bu | F | Bu | Cl | Bu | CH$_3$ | Bu | CHF$_2$ | Bu | CH$_2$F |
| Me | Br | Me | CF$_3$ | Me | Et | Me | CH$_2$CF$_3$ | Me | CF$_2$CF$_3$ |
| Et | Br | Et | CF$_3$ | Et | Et | Et | CH$_2$CF$_3$ | Et | CF$_2$CF$_3$ |
| Pr | Br | Pr | CF$_3$ | Pr | Et | Pr | CH$_2$CF$_3$ | Pr | CF$_2$CF$_3$ |
| i-Pr | Br | i-Pr | CF$_3$ | i-Pr | Et | i-Pr | CH$_2$CF$_3$ | i-Pr | CF$_2$CF$_3$ |
| Bu | Br | Bu | CF$_3$ | Bu | Et | Bu | CH$_2$CF$_3$ | Bu | CF$_2$CF$_3$ |
| Me | Et | Me | Pr | Me | Bu | Me | CCl$_3$ | Me | CHFCHF$_2$ |
| Et | Et | Et | Pr | Et | Bu | Et | CCl$_3$ | Et | CHFCHF$_2$ |
| Pr | Et | Pr | Pr | Pr | Bu | Pr | CCl$_3$ | Pr | CHFCHF$_2$ |
| i-Pr | Et | i-Pr | Prt | i-Pr | Bu | i-Pr | CCl$_3$ | i-Pr | CHFCHF$_2$ |
| Bu | Et | Bu | Pr | Bu | Bu | Bu | CCl$_3$ | Bu | CHFCHF$_2$ |

TABLE 2

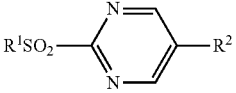

6

| $R^1$ | $R^2$ | $R^1$ | $R^2$ | $R^1$ | $R^2$ | $R^1$ | $R^2$ | $R^1$ | $R^2$ |
|---|---|---|---|---|---|---|---|---|---|
| Me | F | Me | Cl | Me | CH$_3$ | Me | CHF$_2$ | Me | CH$_2$F |
| Et | F | Et | Cl | Et | CH$_3$ | Et | CHF$_2$ | Et | CH$_2$F |
| Pr | F | Pr | Cl | Pr | CH$_3$ | Pr | CHF$_2$ | Pr | CH$_2$F |
| i-Pr | F | i-Pr | Cl | i-Pr | CH$_3$ | i-Pr | CHF$_2$ | i-Pr | CH$_2$F |
| Bu | F | Bu | Cl | Bu | CH$_3$ | Bu | CHF$_2$ | Bu | CH$_2$F |
| Me | Br | Me | CF$_3$ | Me | Et | Me | CH$_2$CF$_3$ | Me | CF$_2$CF$_3$ |
| Et | Br | Et | CF$_3$ | Et | Et | Et | CH$_2$CF$_3$ | Et | CF$_2$CF$_3$ |
| Pr | Br | Pr | CF$_3$ | Pr | Et | Pr | CH$_2$CF$_3$ | Pr | CF$_2$CF$_3$ |
| i-Pr | Br | i-Pr | CF$_3$ | i-Pr | Et | i-Pr | CH$_2$CF$_3$ | i-Pr | CF$_2$CF$_3$ |
| Bu | Br | Bu | CF$_3$ | Bu | Et | Bu | CH$_2$CF$_3$ | Bu | CF$_2$CF$_3$ |
| Me | Et | Me | Pr | Me | Bu | Me | CCl$_3$ | Me | CHFCHF$_2$ |
| Et | Et | Et | Pr | Et | Bu | Et | CCl$_3$ | Et | CHFCHF$_2$ |
| Pr | Et | Pr | Pr | Pr | Bu | Pr | CCl$_3$ | Pr | CHFCHF$_2$ |
| i-Pr | Et | i-Pr | Prt | i-Pr | Bu | i-Pr | CCl$_3$ | i-Pr | CHFCHF$_2$ |
| Bu | Et | Bu | Pr | Bu | Bu | Bu | CCl$_3$ | Bu | CHFCHF$_2$ |

TABLE 3

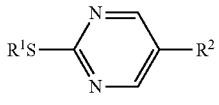

8B wherein m is 0 (i.e. $R^3$ is absent)

| $R^2$ | $R^4$ | $R^2$ | $R^4$ | $R^2$ | $R^4$ | $R^2$ | $R^4$ | $R^2$ | $R^4$ |
|---|---|---|---|---|---|---|---|---|---|
| F | F | Cl | F | CH$_3$ | F | CHF$_2$ | F | CH$_2$F | F |
| F | Cl | Cl | Cl | CH$_3$ | Cl | CHF$_2$ | Cl | CH$_2$F | Cl |
| F | Br | Cl | Br | CH$_3$ | Br | CHF$_2$ | Br | CH$_2$F | Br |
| F | CN | Cl | CN | CH$_3$ | CN | CHF$_2$ | CN | CH$_2$F | CN |
| F | CH$_3$ | Cl | CH$_3$ | CH$_3$ | CH$_3$ | CHF$_2$ | CH$_3$ | CH$_2$F | CH$_3$ |
| F | CHF$_2$ | Cl | CHF$_2$ | CH$_3$ | CHF$_2$ | CHF$_2$ | CHF$_2$ | CH$_2$F | CHF$_2$ |
| F | CF$_3$ | Cl | CF$_3$ | CH$_3$ | CF$_3$ | CHF$_2$ | CF$_3$ | CH$_2$F | CF$_3$ |
| F | OCF$_3$ | Cl | OCF$_3$ | CH$_3$ | OCF$_3$ | CHF$_2$ | OCF$_3$ | CH$_2$F | OCF$_3$ |
| F | SCF$_3$ | Cl | SCF$_3$ | CH$_3$ | SCF$_3$ | CHF$_2$ | SCF$_3$ | CH$_2$F | SCF$_3$ |
| Br | F | CF$_3$ | F | Et | F | CH$_2$CF$_3$ | F | CF$_2$CF$_3$ | F |
| Br | Cl | CF$_3$ | Cl | Et | Cl | CH$_2$CF$_3$ | Cl | CF$_2$CF$_3$ | Cl |
| Br | Br | CF$_3$ | Br | Et | Br | CH$_2$CF$_3$ | Br | CF$_2$CF$_3$ | Br |
| Br | CN | CF$_3$ | CN | Et | CN | CH$_2$CF$_3$ | CN | CF$_2$CF$_3$ | CN |
| Br | CH$_3$ | CF$_3$ | CH$_3$ | Et | CH$_3$ | CH$_2$CF$_3$ | CH$_3$ | CF$_2$CF$_3$ | CH$_3$ |
| Br | CHF$_2$ | CF$_3$ | CHF$_2$ | Et | CHF$_2$ | CH$_2$CF$_3$ | CHF$_2$ | CF$_2$CF$_3$ | CHF$_2$ |
| Br | CF$_3$ | CF$_3$ | CF$_3$ | Et | CF$_3$ | CH$_2$CF$_3$ | CF$_3$ | CF$_2$CF$_3$ | CF$_3$ |
| Br | OCF$_3$ | CF$_3$ | OCF$_3$ | Et | OCF$_3$ | CH$_2$CF$_3$ | OCF$_3$ | CF$_2$CF$_3$ | OCF$_3$ |
| Br | SCF$_3$ | CF$_3$ | SCF$_3$ | Et | SCF$_3$ | CH$_2$CF$_3$ | SCF$_3$ | CF$_2$CF$_3$ | SCF$_3$ |

Each of the following Tables is constructed in the same manner as Table 3 above, except that the header row in Table 3 (i.e. "m is 0 (i.e. $R^3$ is absent)") is replaced with the respective header row shown below. For example, the first entry in Table 4 is a compound of Formula 8 wherein m is 1, $R^3$ is 3-F, $R^2$ is F and $R^4$ is F. The remainder of Table 4 is constructed in the same way, and hence the remainder of Tables 5 through 61 are constructed the same way.

| Table | Header Row | Table | Header Row |
| --- | --- | --- | --- |
| 4 | m is 1, and $R^3$ is 3-F | 5 | m is 1, and $R^3$ is 4-F |
| 6 | m is 1, and $R^3$ is 3-Cl | 7 | m is 1, and $R^3$ is 4-Cl |
| 8 | m is 1, and $R^3$ is 3-Br | 9 | m is 1, and $R^3$ is 4-Br |
| 10 | m is 1, and $R^3$ is 3-I | 11 | m is 1, and $R^3$ is 4-I |
| 12 | m is 1, and $R^3$ is 3-CN | 13 | m is 1, and $R^3$ is 4-CN |
| 14 | m is 1, and $R^3$ is 3-Me | 15 | m is 1, and $R^3$ is 4-Me |
| 16 | m is 1, and $R^3$ is 3-Et | 17 | m is 1, and $R^3$ is 4-Et |
| 18 | m is 1, and $R^3$ is 3-Pr | 19 | m is 1, and $R^3$ is 4-Pr |
| 20 | m is 1, and $R^3$ is 3-OMe | 21 | m is 1, and $R^3$ is 4-OMe |
| 22 | m is 1, and $R^3$ is 3-OEt | 23 | m is 1, and $R^3$ is 4-OEt |
| 24 | m is 1, and $R^3$ is 3-$NH_2$ | 25 | m is 1, and $R^3$ is 4-$NH_2$ |
| 26 | m is 1, and $R^3$ is 3-CH=$CH_2$ | 27 | m is 1, and $R^3$ is 4-CH=$CH_2$ |
| 28 | m is 1, and $R^3$ is 3-CH=$CHCH_3$ | 29 | m is 1, and $R^3$ is 4-CH=$CHCH_3$ |
| 30 | m is 1, and $R^3$ is 3-C≡CH | 31 | m is 1, and $R^3$ is 4-C≡CH |
| 32 | m is 1, and $R^3$ is 3-C≡$CCH_3$ | 33 | m is 1, and $R^3$ is 4-C≡$CCH_3$ |
| 34 | m is 1, and $R^3$ is 3-C(=O)$OCH_3$ | 35 | m is 1, and $R^3$ is 4-C(=O)$OCH_3$ |
| 36 | m is 1, and $R^3$ is 3-C(=O)OEt | 37 | m is 1, and $R^3$ is 4-C(=O)OEt |
| 38 | m is 1, and $R^3$ is 3-OC(=O)$CH_3$ | 39 | m is 1, and $R^3$ is 4-OC(=O)$CH_3$ |
| 40 | m is 1, and $R^3$ is 3-OC(=O)Et | 41 | m is 1, and $R^3$ is 4-OC(=O)Et |
| 42 | m is 1, and $R^3$ is 3-$CH_2OCH_3$ | 43 | m is 1, and $R^3$ is 4-$CH_2OCH_3$ |
| 44 | m is 1, and $R^3$ is 3-$CF_3$ | 45 | m is 1, and $R^3$ is 4-$CF_3$ |
| 46 | m is 1, and $R^3$ is 3-$CH_2F$ | 47 | m is 1, and $R^3$ is 4-$CH_2F$ |
| 48 | m is 1, and $R^3$ is 3-$CHF_2$ | 49 | m is 1, and $R^3$ is 4-$CHF_2$ |
| 50 | m is 1, and $R^3$ is 3-$CH_2CF_3$ | 51 | m is 1, and $R^3$ is 4-$CH_2CF_3$ |
| 52 | m is 1, and $R^3$ is 3-$CF_2CF_3$ | 53 | m is 1, and $R^3$ is 4-$CF_2CF_3$ |
| 54 | m is 2, and $R^3$ is 3,4-di-F | 55 | m is 2, and $R^3$ is 3,4-di-Cl |
| 56 | m is 2, and $R^3$ is 3-Cl, 4-F | 57 | m is 2, and $R^3$ is 3-F, 4-Cl |
| 58 | m is 2, and $R^3$ is 3-Cl, 4-Me | 59 | m is 2, and $R^3$ is 3-F, 4-Me |
| 60 | m is 2, and $R^3$ is 3-Me, 4-F | 61 | m is 2, and $R^3$ is 3-Me, 4-Cl |

What is claimed is:

1. A method for preparing a compound of Formula 1

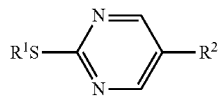

wherein
$R^1$ is $C_1$-$C_4$ alkyl; and
$R^2$ is halogen, or $C_1$-$C_4$ alkyl;
the method comprising treating a compound of Formula 2

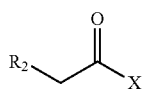

wherein
$R^2$ is halogen, or $C_1$-$C_4$ alkyl; and
X is Cl or OH
in the presence of a halogenating agent and a compound of Formula 3

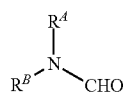

wherein
$R^A$ and $R^B$ are each independently $C_1$-$C_4$ alkyl; or
$R^A$ and $R^B$ are taken together to be —$(CH_2)_4$—, —$(CH_2)_5$— or —$CH_2CH_2OCH_2CH_2$— to provide an intermediate of Formula 4

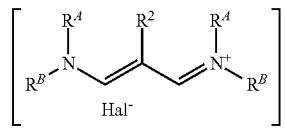

wherein
$R^2$ is halogen, or $C_1$-$C_4$ alkyl; and
$R^A$ and $R^B$ are each independently $C_1$-$C_4$ alkyl; or
$R^A$ and $R^B$ are taken together to be —$(CH_2)_4$—, —$(CH_2)_5$— or —$CH_2CH_2OCH_2CH_2$—; and
$Hal^-$ is chloride ion or bromide ion; and
treating the intermediate of Formula 4 in the presence of a base with an acid salt of a compound of Formula 5

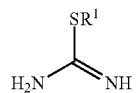

wherein $R^1$ is $C_1$-$C_4$ alkyl.

2. The method of claim 1 wherein $R^1$ is $C_1$-$C_2$ alkyl; and each $R^A$ and $R^B$ is methyl.

3. The method of claim 2 wherein $R^1$ is methyl and $R^2$ is halogen.

4. The method of claim 3 wherein $R^2$ is chlorine.

5. The method of claim 1 wherein X is Cl.

6. The method of claim 1 further comprising preparing a compound of Formula 6

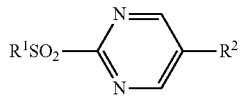

6 wherein
R$^1$ is C$_1$-C$_4$ alkyl; and
R$^2$ is halogen, or C$_1$-C$_4$ alkyl
by treating a compound of Formula 1 with an oxidant.

7. The method of claim 6 further comprising preparing a compound of Formula 8

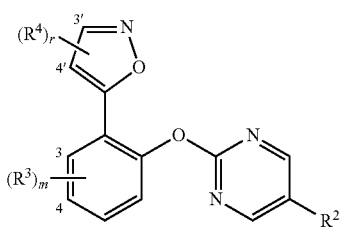

8 wherein
R$^2$ is halogen, or C$_1$-C$_4$ alkyl;
each R$^3$ is independently halogen, cyano, amino, C$_1$-C$_4$ alkyl, C$_2$-C$_4$ alkenyl, C$_2$-C$_4$ alkynyl, C$_1$-C$_4$ alkoxy, C$_2$-C$_4$ alkoxycarbonyl, C$_2$-C$_4$ alkylcarbonyloxy, C$_2$-C$_4$ alkoxyalkyl or C$_1$-C$_4$ haloalkyl;
each R$^4$ is independently halogen, cyano, C$_1$-C$_4$ alkyl, C$_1$-C$_4$ alkoxy, C$_1$-C$_4$ haloalkyl, C$_1$-C$_4$ haloalkoxy or SCF$_3$;
m is 0, 1, 2 or 3; and
r is 0, 1 or 2;
by treating the compound of Formula 6

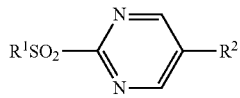

6 wherein
R$^1$ is C$_1$-C$_4$ alkyl; and
R$^2$ is halogen, or C$_1$-C$_4$ alkyl
in the presence of a second base with a compound of Formula 7

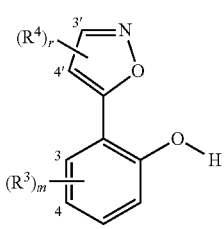

7 wherein
R$^2$ is halogen, or C$_1$-C$_4$ alkyl;
each R$^3$ is independently halogen, cyano, amino, C$_1$-C$_4$ alkyl, C$_2$-C$_4$ alkenyl, C$_2$-C$_4$ alkynyl, C$_1$-C$_4$ alkoxy, C$_2$-C$_4$ alkoxycarbonyl, C$_2$-C$_4$ alkylcarbonyloxy, C$_2$-C$_4$ alkoxyalkyl or C$_1$-C$_4$ haloalkyl;
each R$^4$ is independently halogen, cyano, C$_1$-C$_4$ alkyl, C$_1$-C$_4$ alkoxy, C$_1$-C$_4$ haloalkyl, C$_1$-C$_4$ haloalkoxy or SCF$_3$;
m is 0, 1, 2 or 3; and
r is 0, 1 or 2.

8. The method of claim 7 wherein
m is 0 or 1;
r is 0 or 1;
R$^2$ is halogen;
R$^3$ is halogen, cyano, C$_1$-C$_4$ alkyl or C$_1$-C$_4$ haloalkyl, wherein when m is 1, R$^3$ is attached to the remainder of Formula 7 and Formula 8 at the 3-position; and
R$^4$ is C$_1$-C$_4$ haloalkyl, wherein when r is 1, R$^4$ is substituted on the remainder of Q at the 3'-position.

9. The method of claim 8 wherein R$^2$ and R$^3$ are both chlorine.

10. The method of claim 8 wherein R$^4$ is C$_1$ fluoroalkyl.

11. The method of claim 7 wherein the compound of Formula 8 is selected from the group consisting of
2-[2-(3-bromo-5-isoxazolyl) phenoxy]-5-chloropyrimidine,
5-chloro-2-[2-[3-(difluoromethyl)-5-isoxazolyl]phenoxy]pyrimidine,
5-chloro-2-[2-[3-(trifluoromethyl)-5-isoxazolyl]phenoxy]pyrimidine,
5-chloro-2-[2-[3-(difluoromethyl)-5-isoxazolyl]-3-fluorophenoxy]pyrimidine,
5-bromo-2-[2-[3-(difluoromethyl)-5-isoxazolyl]-3-fluorophenoxy]pyrimidine,
5-chloro-2-[2-[3-(trifluoromethyl)-5-isoxazolyl]-3-chlorophenoxy]pyrimidine,
5-chloro-2-[2-[3-(trifluoromethyl)-5-isoxazolyl]-3-fluorophenoxy]pyrimidine,
5-chloro-2-[2-[3-(difluoromethyl)-5-isoxazolyl]-3-chlorophenoxy]pyrimidine,
5-bromo-2-[2-[3-(difluoromethyl)-5-isoxazolyl]-3-chlorophenoxy]pyrimidine,
5-bromo-2-[2-[3-(trifluoromethyl)-5-isoxazolyl]-3-chlorophenoxy]pyrimidine and
5-chloro-2-[2-[3-(difluoromethyl)-5-isoxazolyl]-3-bromophenoxy]pyrimidine.

12. The method of claim 11 wherein the compound of Formula 8 is 5-chloro-2-[2-[3-(difluoromethyl)-5-isoxazolyl]-3-chlorophenoxy]pyrimidine.

13. A method for preparing a compound of Formula 8,

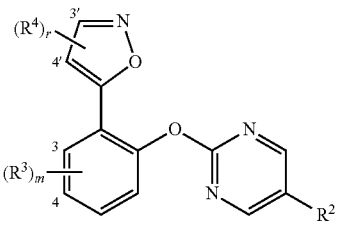

8 wherein

R² is halogen, or $C_1$-$C_4$ alkyl;

each R³ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl;

each R⁴ is independently halogen, cyano, $C_1$-$C_4$ alkyl, $C_1$-$C_4$ alkoxy, $C_1$-$C_4$ haloalkyl, $C_1$-$C_4$ haloalkoxy or $SCF_3$;

m is 0, 1, 2 or 3; and r is 0, 1 or 2;

comprising treating a compound of Formula 2

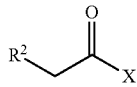

2 wherein

R² is halogen, or $C_1$-$C_4$ alkyl; and

X is Cl or OH in the presence of a halogenating agent and a compound of Formula 3

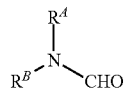

3 wherein $R^A$ and $R^B$ are each independently $C_1$-$C_4$ alkyl; or $R^A$ and $R^B$ are taken together to be —(CH₂)₄—, —(CH₂)₅— or —CH₂CH₂OCH₂CH₂— to provide an intermediate of Formula 4

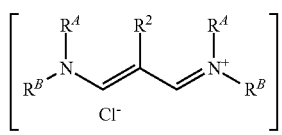

4 wherein

R² is halogen, or $C_1$-$C_4$ alkyl; and $R^A$ and $R^B$ are each independently $C_1$-$C_4$ alkyl; or $R^A$ and $R^B$ are taken together to be —(CH₂)₄—, —(CH₂)₅— or —CH₂CH₂OCH₂CH₂—;

treating the intermediate of Formula 4 with an acid salt of a compound of Formula 5

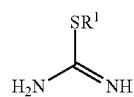

5 wherein R¹ is $C_1$-$C_4$ alkyl;

in the presence of a base to prepare a compound of Formula 1

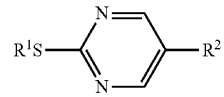

1 wherein

R¹ is $C_1$-$C_4$ alkyl;

R² is halogen, or $C_1$-$C_4$ alkyl;

treating the compound of Formula 1 with an oxidant to provide a compound of Formula 6

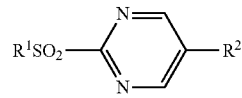

6 wherein

R¹ is $C_1$-$C_4$ alkyl; and

R² is halogen, or $C_1$-$C_4$ alkyl; and treating the compound of Formula 6 in the presence of a second base with a compound of

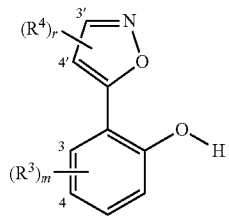

7 wherein each R³ is independently halogen, cyano, amino, $C_1$-$C_4$ alkyl, $C_2$-$C_4$ alkenyl, $C_2$-$C_4$ alkynyl, $C_1$-$C_4$ alkoxy, $C_2$-$C_4$ alkoxycarbonyl, $C_2$-$C_4$ alkylcarbonyloxy, $C_2$-$C_4$ alkoxyalkyl or $C_1$-$C_4$ haloalkyl;

each R⁴ is independently halogen, cyano, $C_1$-$C_4$ alkyl, $C_1$-$C_4$ alkoxy, $C_1$-$C_4$ haloalkyl, $C_1$-$C_4$ haloalkoxy or $SCF_3$;

m is 0, 1, 2 or 3; and r is 0, 1 or 2.

14. The method of claim 13 wherein

R¹ is $C_1$-$C_2$ alkyl; and each $R^A$ and $R^B$ is methyl.

15. The method of claim 14 wherein R¹ is methyl and R² is halogen.

16. The method of claim 13 wherein m is 0 or 1;

r is 0 or 1;

R² is halogen;

R³ is halogen, cyano, $C_1$-$C_4$ alkyl or $C_1$-$C_4$ haloalkyl, wherein when m is 1, R³ is attached to the remainder of Formula 7 and Formula 8 at the 3-position; and R⁴ is $C_1$-$C_4$ haloalkyl; wherein when r is 1, R⁴ is at the 3'-position.

17. The method of claim 16 wherein $R^2$ and $R^3$ are both chlorine.

18. The method of claim 16 wherein $R^4$ is $C_1$ fluoroalkyl.

19. The method of claim 13 wherein the compound of Formula 8 is selected from the group consisting of
2-[2-(3-bromo-5-isoxazolyl) phenoxy]-5-chloropyrimidine,
5-chloro-2-[2-[3-(difluoromethyl)-5-isoxazolyl]phenoxy]pyrimidine,
5-chloro-2-[2-[3-(trifluoromethyl)-5-isoxazolyl]phenoxy]pyrimidine,
5-chloro-2-[2-[3-(difluoromethyl)-5-isoxazolyl]-3-fluorophenoxy]pyrimidine,
5-bromo-2-[2-[3-(difluoromethyl)-5-isoxazolyl]-3-fluorophenoxy]pyrimidine,
5-chloro-2-[2-[3-(trifluoromethyl)-5-isoxazolyl]-3-chlorophenoxy]pyrimidine,
5-chloro-2-[2-[3-(trifluoromethyl)-5-isoxazolyl]-3-fluorophenoxy]pyrimidine,
5-chloro-2-[2-[3-(difluoromethyl)-5-isoxazolyl]-3-chlorophenoxy]pyrimidine,
5-bromo-2-[2-[3-(difluoromethyl)-5-isoxazolyl]-3-chlorophenoxy]pyrimidine,
5-bromo-2-[2-[3-(trifluoromethyl)-5-isoxazolyl]-3-chlorophenoxy]pyrimidine and
5-chloro-2-[2-[3-(difluoromethyl)-5-isoxazolyl]-3-bromophenoxy]pyrimidine.

20. The method of claim 19 wherein the compound of Formula 8 is 5-chloro-2-[2-[3-(difluoromethyl)-5-isoxazolyl]-3-chlorophenoxy]pyrimidine.

* * * * *